US012610170B1

(12) United States Patent
Lu et al.

(10) Patent No.: US 12,610,170 B1
(45) Date of Patent: Apr. 21, 2026

(54) MICROPHONE BODY AND DESKTOP MICROPHONE

(71) Applicant: GUANGDONG DINGCHUANG SMART MANUFACTURING CO., LTD., Dongguan (CN)

(72) Inventors: Jun Lu, Dongguan (CN); Mingjun Li, Dongguan (CN); Kun Yang, Dongguan (CN)

(73) Assignee: GUANGDONG DINGCHUANG SMART MANUFACTURING CO., LTD., Dongguan (CN)

( * ) Notice: Subject to any disclaimer, the term of this patent is extended or adjusted under 35 U.S.C. 154(b) by 0 days.

(21) Appl. No.: 19/314,257

(22) Filed: Aug. 29, 2025

(30) Foreign Application Priority Data

Jul. 16, 2025 (CN) ........................ 202510983396.4

(51) Int. Cl.
*H04R 1/04* (2006.01)
*H04R 1/08* (2006.01)

(52) U.S. Cl.
CPC ............... *H04R 1/083* (2013.01); *H04R 1/04* (2013.01); *H04R 2410/03* (2013.01); *H04R 2420/07* (2013.01); *H04R 2420/09* (2013.01)

(58) Field of Classification Search
CPC . H04R 1/04; H04R 1/08; H04R 1/083; H04R 2410/00; H04R 2420/07; H04R 2420/09
See application file for complete search history.

(56) References Cited

U.S. PATENT DOCUMENTS 10,749,287 B2 * 8/2020 Harwood ............. H01R 13/639
11,917,381 B2 * 2/2024 Grosz ....................... H04R 1/04
12,149,913 B2 * 11/2024 Shumard ............... G10L 19/008
12,212,910 B2 * 1/2025 Burke ....................... H04R 1/08

* cited by examiner

*Primary Examiner* — Ryan Robinson
(74) *Attorney, Agent, or Firm* — HOWARD M COHN and Associates, LLC

(57) ABSTRACT

A microphone body and a desktop microphone are provided. The desktop microphone includes a wireless communicator for connecting with a terminal. The microphone body includes a housing, a main control assembly, a wire interface assembly, and a wireless assembly. The housing has an accommodating chamber; at least part of the main control assembly is located inside the accommodating chamber and connected to the housing. The main control assembly is used to control transmission and reception of audio signals; at least part of the wire interface assembly is located within the accommodating chamber, and the wire interface assembly is electrically connected to the main control assembly; at least part of the wireless assembly is located inside the accommodating chamber, and the wireless assembly is electrically connected to the main control assembly. The wireless assembly is used for wireless communication with the wireless communicator.

25 Claims, 13 Drawing Sheets

MICROPHONE BODY AND DESKTOP MICROPHONE

CROSS-REFERENCE TO RELATED APPLICATIONS

The application claims priority of Chinese patent application CN2025109833964, filed on Jul. 16, 2025, the entire disclosures of which are incorporated herein by reference.

TECHNICAL FIELD

The present disclosure relates to the technical field of audio equipments, and in particular, to a microphone body and a desktop microphone.

BACKGROUND

Currently, desktop microphones on the market can be classified into wire desktop microphones and wireless desktop microphones according to their types. Wire desktop microphones are connected to terminals through wire communication to achieve audio signal transmission, while wireless desktop microphones are connected to terminals through wireless communication to achieve audio signal transmission.

For wire desktop microphones, their advantages lie in stability and low latency. However, wire desktop microphones are limited by cable length, have poor mobility, and have messy desktop wiring, which cannot meet the needs of flexible scenarios such as remote meetings, live streaming, and mobile recording. For wireless desktop microphones, their advantage lies in breaking free from cable constraints and facilitating mobile use. However, the wireless transmission of wireless desktop microphones is susceptible to co-frequency interference and multipath reflection, resulting in decreased sound quality or signal interruption. Therefore, it is necessary to design a new type of microphone, which has become an urgent problem to be solved.

SUMMARY

The present disclosure provides a microphone body and a desktop microphone, which can effectively solve the problem of the inability to balance the stability of wire desktop microphones and the flexibility of wireless desktop microphones.

In one aspect, a microphone body for desktop microphone is provided. The desktop microphone includes a wireless communicator for connecting with a terminal. The microphone body includes a housing, a main control assembly, a wire interface assembly, and a wireless assembly. The housing has an accommodating chamber; at least part of the main control assembly is located inside the accommodating chamber and connected to the housing. The main control assembly is used to control transmission and reception of audio signals; at least part of the wire interface assembly is located within the accommodating chamber, and the wire interface assembly is electrically connected to the main control assembly; at least part of the wireless assembly is located inside the accommodating chamber, and the wireless assembly is electrically connected to the main control assembly. The wireless assembly is used for wireless communication with the wireless communicator.

In another aspect, a desktop microphone includes a wireless communicator and the microphone body mentioned above. The wireless communicator is used to connect with the terminal, and the wireless assembly communicates wirelessly with the wireless communicator.

Beneficial effects of the present disclosure are as follows: based on the microphone body and desktop microphone of the present embodiment, by designing a wire interface assembly, the wire interface assembly is connected to the terminal through a data cable to achieve audio signal transmission through wire transmission; by designing a wireless assembly, the wireless assembly is wirelessly connected to the terminal through a wireless communicator to achieve audio signal transmission through wireless transmission; by integrating the wire interface assembly and wireless assembly into the housing of the same desktop microphone body, compared to the wire desktop microphone used only for wire transmission and the wireless desktop microphone used only for wireless transmission in related technologies, the pain point of the inability to balance the stability of wire desktop microphones and the flexibility of wireless desktop microphones is completely solved. This achieves significant advantages of one machine covering the entire scene, one machine replacing two devices, and one machine simplifying the entire link, effectively improving user experience.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

Figure 1:
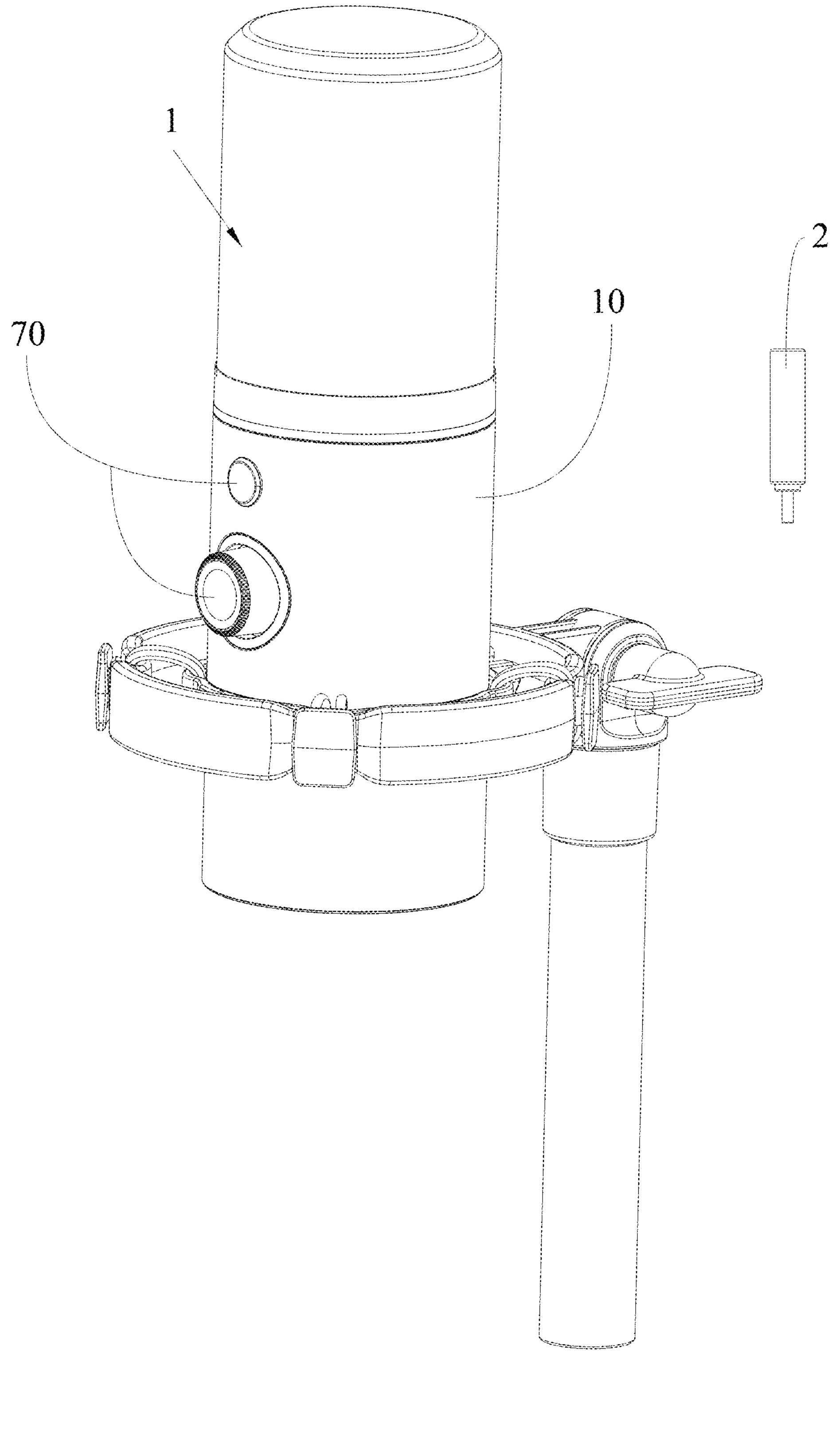
FIG. 1 is a schematic diagram of a microphone body in one viewing angle according to one embodiment of the present disclosure.
Figure 2:
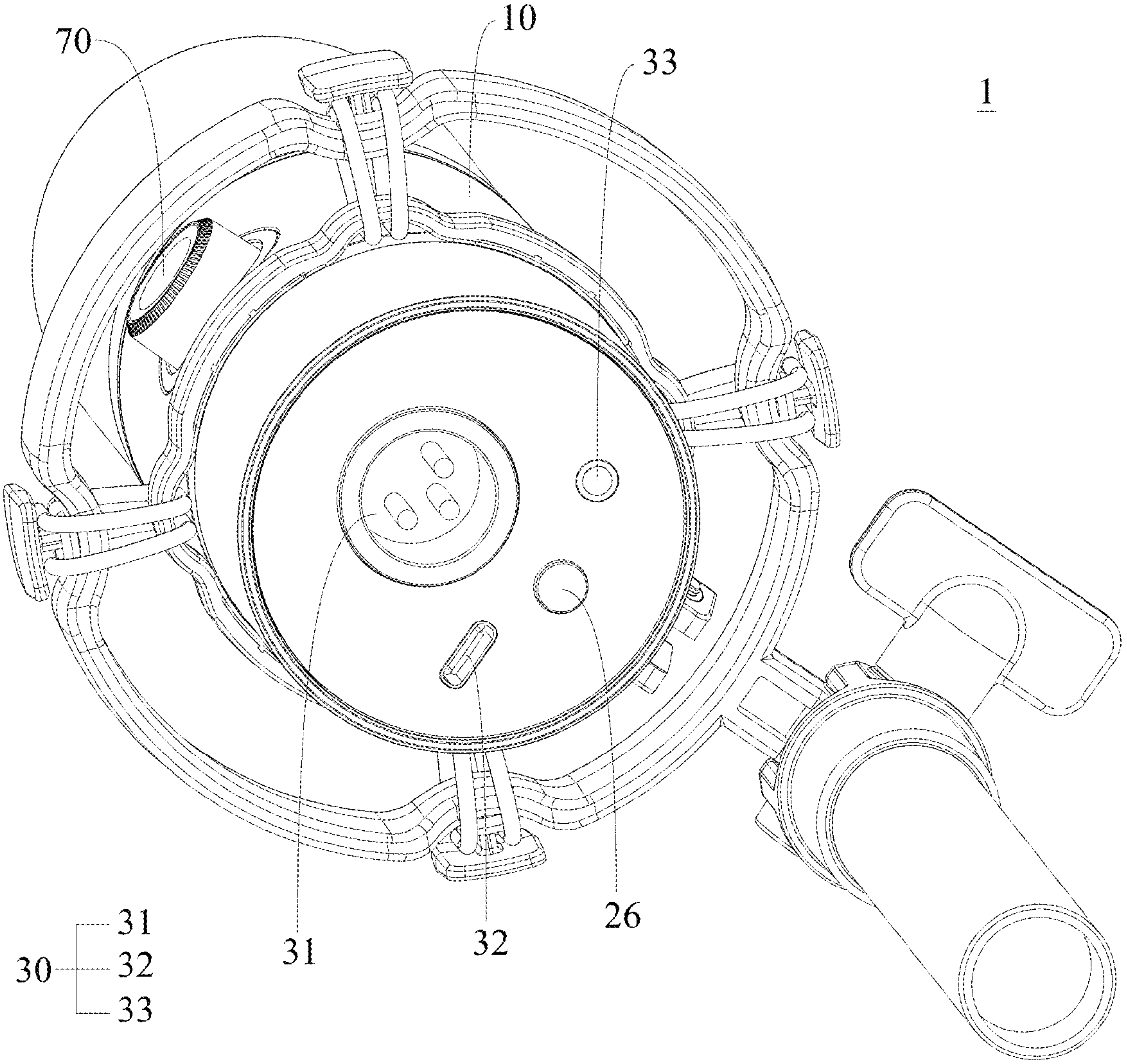
FIG. 2 is a schematic diagram of a microphone body in another viewing angle according to one embodiment of the present disclosure.
Figure 3:
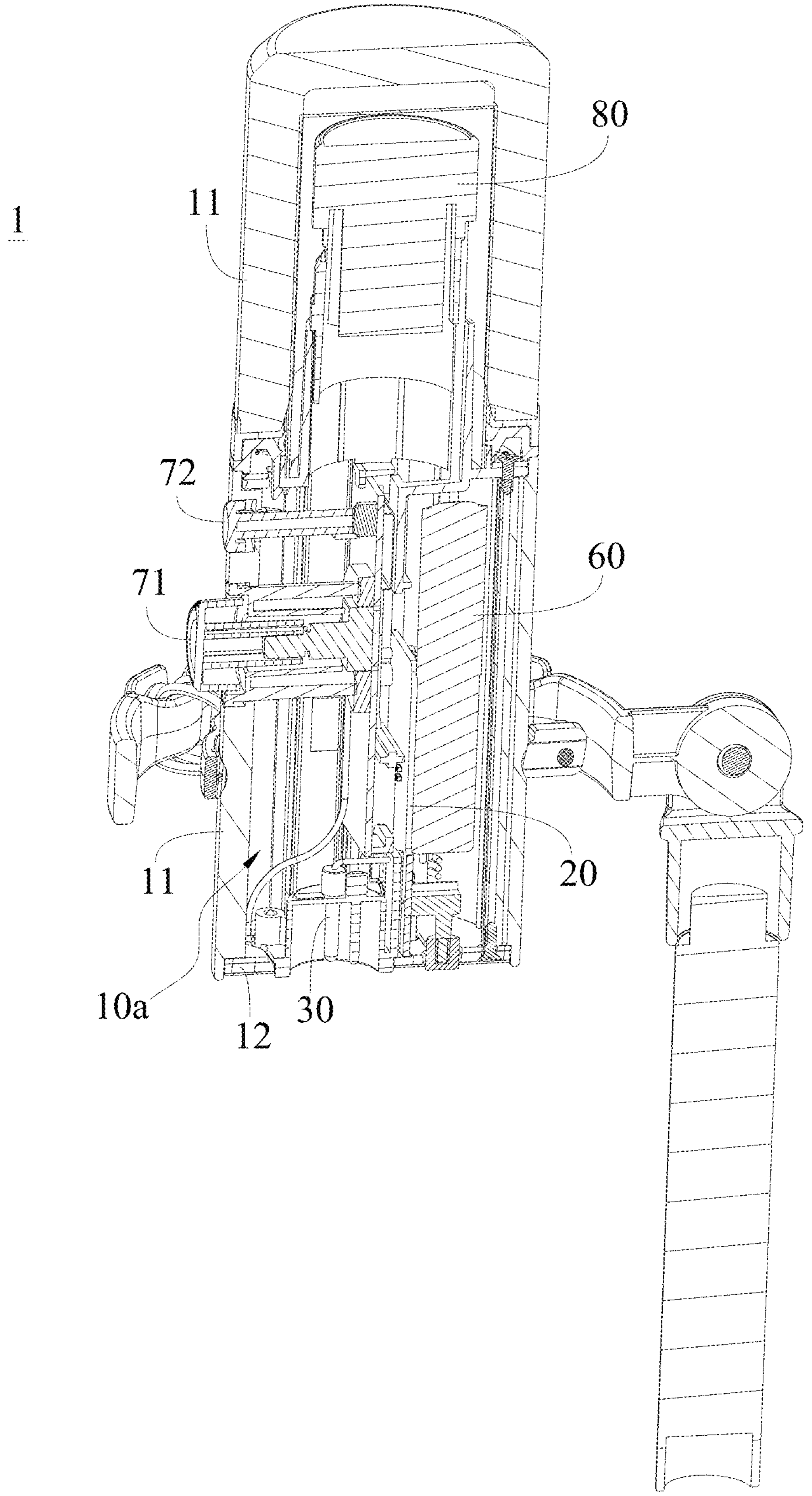
FIG. 3 is a cross sectional view of a microphone body according to one embodiment of the present disclosure.
Figure 4:
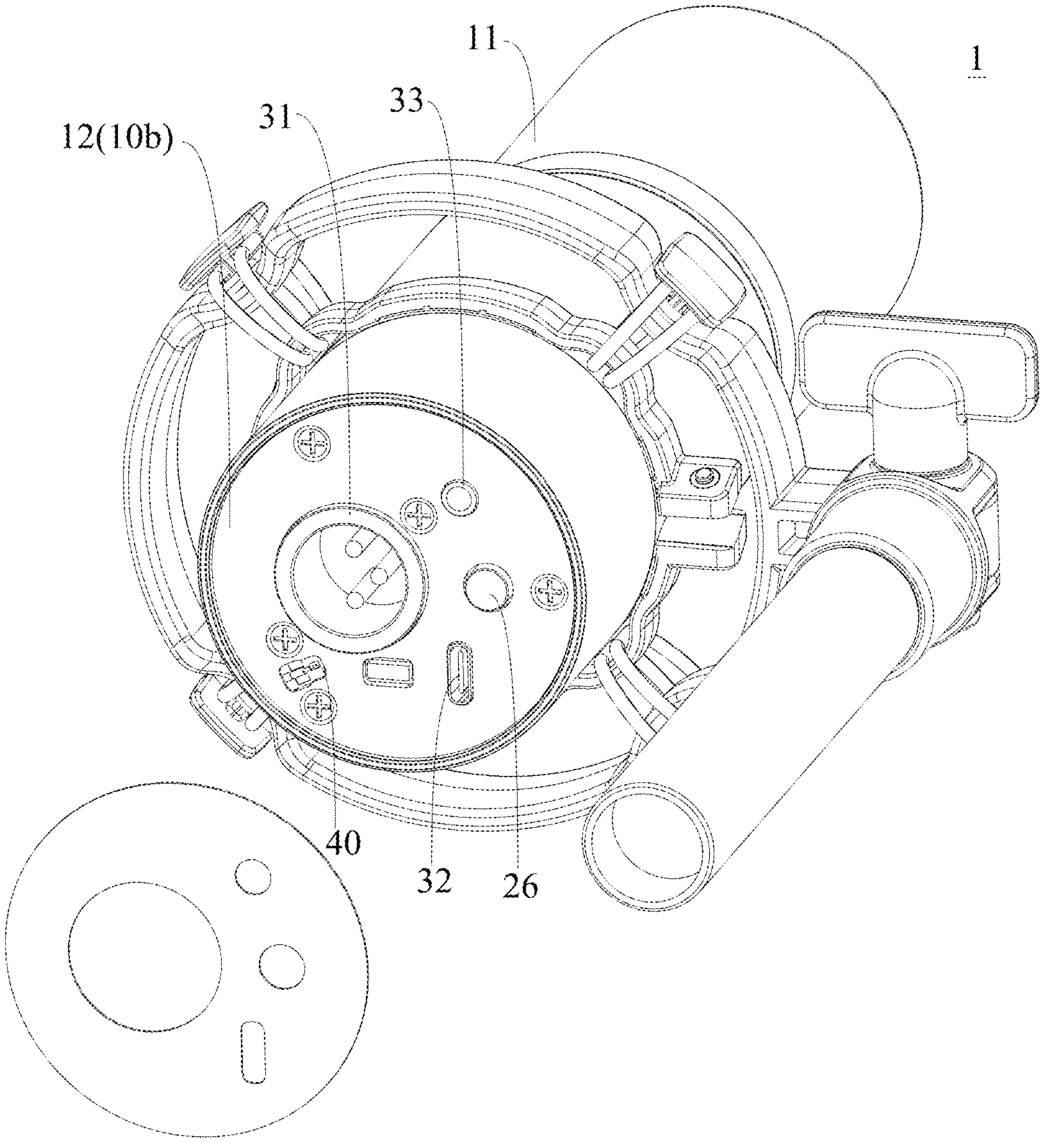
FIG. 4 is a first partially exploded diagram of a microphone body according to one embodiment of the present disclosure.

DRAWING REFERENCES microphone body 1; housing 10; accommodating chamber 10*a*; avoidance portion 10*b*; shell 11; cover 12; opening 12*a*; first through hole 12*b*; second through hole 12*e*; third through hole 12*f*; fourth through hole 12*g*; fifth through hole 12*h*; first part 12*c*; second part 12*d*; main control assembly 20; circuit board 20*a*; main circuit board 21; auxiliary circuit board 22; first circuit board 211; second circuit board 212; hollow hole 22*a*; conductive components 23; wire 231; controller 24; reset switch 25; power switch 26; electrical connector 27; wire interface assembly 30; XLR interface 31; USB interface 32; earphone jack 33; wireless assembly 40; integrated antenna 41; bracket 50; first side M; second side N; battery 60; input assembly 70; knobs 71; buttons 72; microphone head 80; wireless communicator 2; reference surface P.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 7, the present invention proposes a desktop microphone that can solve a problem of a balance between the stability of wire desktop microphones and the flexibility of wireless desktop microphones.

Desktop microphone is a type of microphone that is placed on a flat surface such as a desktop and can be used, but is not limited to, in video conferencing, online courses, short video dubbing, podcast recording, music cover, home karaoke, live interaction, and other scenarios.

The desktop microphone includes a microphone body 1 and a support structure (not shown in the figure). The support structure is connected to the microphone body 1 to support it, so that the microphone body 1 can be stably placed on the desktop through the support structure. Among them, the support structure can be, but is not limited to, detachably connected to the microphone body 1 through at least one of screwing, clamping, or plugging, and the support structure can also be, but is not limited to, non detachably connected to the microphone body 1 through riveting, bonding, or welding. The specific manifestations of supporting structures have diversity, for example, when there is no connection between the support structure and the desktop, the support structure may include a support base, which is connected to the microphone body 1, at this situation, the microphone body 1 can be placed smoothly on the desktop directly through the support base. Of course, the support structure may also include a support tripod, which is connected to the microphone body 1, in this situation, the microphone body 1 can be supported smoothly on the desktop directly through the support tripod. In another situation, for example, when there is a connection relationship between the support structure and the desktop, the support structure may include a support cantilever fixed frame, one end of which is connected to the microphone body 1, and the other end of which can be positioned on the desktop through clamping or screw locking. In other situations, the support structure can also be positioned on the desktop through negative pressure suction (where the support structure includes suction cups) or magnetic suction (where the support structure includes magnets).

The desktop microphone also includes a wireless communicator 2.

The wireless communicator 2 communicates wirelessly with the microphone body 1 to achieve the transmission of audio signals (including real-time audio signals and processed audio signals as described below) through wireless transmission. Wireless communicator 2 is used to connect with terminals; among them, terminals can include but are not limited to tablets, laptops, desktop computers, ultra mobile personal computers (UMPCs), netbooks, mobile phones, etc.

The audio signal includes a real-time audio signal emitted by a user and collected by the microphone head 80 of the wireless microphone body 1 and a processed audio signal obtained after processing. Among them, the real-time audio signal can be processed by the microphone body 1 to obtain the processed audio signal, or the real-time audio signal can also be processed by the terminal to obtain the processed audio signal, or the real-time audio signals can be, but are not limited to, processed audio signals obtained through voice conversion processing.

When the real-time audio signal is processed by the microphone body 1 to obtain the processed audio signal, it can be that the microphone body 1 does not process the real-time audio signal according to the user's instruction to turn off the processing function, the microphone body 1 directly sends the collected real-time audio signal to the wireless communicator 2 through wireless transmission, and the wireless communicator 2 sends the real-time audio signal to the terminal, so that the terminal can perform real-time broadcasting based on the real-time audio signal. Alternatively, the microphone body 1 can process the real-time audio signal according to the user's command to enable the processing function and obtain the processed audio signal, the microphone body 1 will send the processed audio signal to the wireless communicator 2 through wireless transmission, and the wireless communicator 2 will send the processed audio signal to the terminal, so that the terminal can perform real-time broadcasting based on the processed audio signal.

It should be noted that if there is an earphone connected to the communication of microphone body 1 at this time, the user can use the earphone to listen the real-time audio signal in real time, and the user can also use the earphone to listen the processed audio signal in real time.

When the real-time audio signal is processed by the terminal to obtain the processed audio signal, it can be that the microphone body 1 sends the collected real-time audio signal to the wireless communicator 2 through wireless transmission, and the wireless communicator 2 sends the real-time audio signal to the terminal, the terminal does not process the real-time audio signal according to the user's instruction to turn off the processing function, so that the terminal broadcasts in real-time based on the real-time audio signal. Alternatively, the microphone body 1 can transmit the collected real-time audio signal wirelessly to the wireless communicator 2, which then sends the real-time audio signal to the terminal, the terminal processes the real-time audio signal based on the user's command to activate the processing function and obtains the processed audio signal, allowing the terminal to broadcast in real-time based on the processed audio signal.

It should be noted that if there is an earphone connected to the communication of microphone body 1 at this time, users can use the earphone to listen real-time audio signals in real time. Of course, the terminal can also send the processed audio signal to the wireless communicator 2, which then transmits the processed audio signal wirelessly to the microphone body 1, at this time, the user can also listen the processed audio signal in real time with the help of the earphone.

It should be noted that the earphones in this application are only used to listen real-time audio signals or processed audio signals, and have obtained user permission, without involving other personal privacy data.

The microphone body 1 is the focus of this application, and the specific structure of the microphone body 1 will be described below in conjunction with FIGS. 1-13.

As shown in FIGS. 1-7, the microphone body 1 includes a housing 10, a main control assembly 20, a wire interface assembly 30, and a wireless assembly 40.

The housing 10 serves as the shell component of the microphone body 1, the specific shape of the housing 10 is not limited here, and designers can make reasonable designs according to actual needs, for example, the outer contour of the cross-section of the housing 10 can be, but is not limited to, circular, triangular, rectangular, hexagonal, or octagonal.

The housing 10 has an accommodating chamber 10*a*, which is the hollow area inside the housing 10.

The main control assembly 20 serves as the control center for the microphone body 1, the specific structure of the main control assembly 20 will be introduced in the following text.

At least part of the main control assembly 20 is located within the accommodating chamber 10*a* of the housing 10, for example, the main control assembly 20 can be completely accommodated in the accommodating chamber 10*a* of the housing 10. Alternatively, the main control assembly 20 can also be partially accommodated in the accommodation chamber 10*a* of the housing 10, while the remaining part extends outside the accommodation chamber 10*a* of the housing 10.

The main control assembly 20 is connected to the housing 10, for example, when the main control assembly 20 is directly connected to the housing 10, the main control assembly 20 can be detachably connected to the housing 10 through at least one of screw connection, card connection, or plug connection. The main control assembly 20 can also be non detachably connected to the housing 10 through adhesive or riveting. In other cases, when the main control assembly 20 is indirectly connected to the housing 10 (such as the main control assembly 20 being connected to the housing 10 through an intermediate connection structure), the main control assembly 20 can be detachably connected to a certain intermediate connection structure (such as the bracket 50 described below) through at least one of screw connection, card connection, or plug connection, and the main control assembly 20 can also be non detachably connected to a certain intermediate connection structure through adhesive or riveting.

The main control assembly 20 is used to control transmission and reception of audio signals, the real-time audio signal collected by the microphone head 80 of the microphone body 1 is processed by the main control assembly 20 to obtain the processed audio signal.

Regarding the reception of audio signals by the main control assembly 20, the main control assembly 20 can receive processed audio signals obtained through terminal processing (one of the above mentioned audio signals), and the main control assembly 20 can send the processed audio signals obtained through terminal processing to the earphones connected to the microphone main body 1 for real-time listening by the user through the earphones.

Regarding the transmission of audio signals by the main control assembly 20, the main control assembly 20 can send the real-time audio signal collected by the microphone head 80 of the microphone body 1 (another one of the above mentioned audio signals) to the earphones in communication with the microphone body 1, so that the user can listen the real-time audio signal in real time through the earphones. Alternatively, the main control assembly 20 can also send the processed audio signal to the earphones connected to the microphone body 1 for real-time listening by the user through the earphones. Alternatively, the main control assembly 20 can send the real-time audio signal collected by the microphone head 80 of the microphone body 1 to the wireless communicator 2 through the wireless assembly 40, the wireless communicator 2 will then send the real-time audio signal to the terminal, allowing the terminal to broadcast in real-time based on the real-time audio signal. Alternatively, the main control assembly 20 can send the processed audio signal to the wireless communicator 2 through the wireless assembly 40, and the wireless communicator 2 will send the processed audio signal to the terminal for real-time broadcasting based on the processed audio signal.

As shown in FIGS. 1-7, the wire interface assembly 30 serves as the wire interface end of the microphone body 1, the wire interface assembly 30 is connected to the terminal through a data cable to achieve audio signal transmission through wire transmission. The specific structure of the wire interface assembly 30 will be introduced in the following text.

At least part of the wire interface assembly 30 is located within the accommodating chamber 10*a* of the housing 10, for example, the wire interface assembly 30 can be completely accommodated in the accommodating cavity 10*a* of the housing 10, or the wire interface assembly 30 can also be partially accommodated within the accommodation chamber 10*a* of the housing 10, while the remaining portion extends outside the accommodation chamber 10*a* of the housing 10.

The wire interface assembly 30 is electrically connected to the main control assembly 20, so that real-time audio signals and/or processed audio signals obtained by the main control assembly 20 are sent to the terminal through the wire interface assembly 30 in a wire transmission manner, or the processed audio signals obtained by the terminal are sent to the main control assembly 20 through the wire interface assembly 30 in a wire transmission manner.

As shown in FIGS. 1-7, the wireless assembly 40 serves as the wireless communication end of the microphone body 1, the wireless assembly 40 is wirelessly connected to the terminal through a wireless communicator 2 to achieve audio signal transmission through wireless transmission. The specific structure of wireless assembly 40 will be introduced in the following text.

At least part of the wireless assembly 40 is located within the accommodating chamber 10*a* of the housing 10, for example, the wireless assembly 40 can be completely accommodated in the accommodating cavity 10*a* of the housing 10, or the wireless assembly 40 can also be partially accommodated in the accommodation chamber 10*a* of the housing 10, while the remaining part extends outside the accommodation chamber 10*a* of the housing 10.

The wireless assembly 40 is electrically connected to the main control assembly 20, so that real-time audio signals and/or processed audio signals obtained by the main control assembly 20 are transmitted wirelessly through the wireless assembly 40 to the wireless communicator 2, and then transmitted to the terminal through the wireless communicator 2, or the processed audio signals obtained by the terminal are transmitted wirelessly through the wireless communicator 2 to the wireless assembly 40, and then transmitted to the main control assembly 20 through the wireless assembly 40. In particular, the main control assembly 20 includes a circuit board 20*a* connected to the housing 10, the wire interface assembly 30 is arranged on the circuit board 20*a* and is electrically connected to the circuit board 20*a*, and the wireless assembly 40 is arranged on the circuit board 20*a* and is electrically connected to the circuit board 20*a*. The circuit board 20*a* includes a main circuit board 21 (as described below) and an auxiliary circuit board 22 (as described below).

The wireless assembly 40 is used for wireless communication with a wireless communicator 2 to achieve audio signal transmission through wireless transmission.

For example, the microphone head 80 of the microphone body 1 sends the collected real-time audio signal to the main control assembly 20, the main control assembly 20 does not process the real-time audio signal according to the user's instruction to turn off the processing function, the main control assembly 20 directly sends the real-time audio signal to the wireless assembly 40, the wireless assembly 40 sends the real-time audio signal to the wireless communicator 2 through wireless transmission, and the wireless communicator 2 sends the real-time audio signal to the terminal, so that the terminal can perform real-time broadcasting based on the real-time audio signal.

In another situation, for example, the microphone core 80 of the microphone body 1 sends the collected real-time audio signal to the main control assembly 20, the main control assembly 20 processes the real-time audio signal according to the user's instruction to enable the processing function and obtains the processed audio signal, the main control assembly 20 sends the processed audio signal to the wireless assembly 40, which sends the processed audio signal to the wireless communicator 2 through wireless transmission, the wireless communicator 2 sends the processed audio signal to the terminal, so that the terminal can broadcast in real time based on the processed audio signal.

In further another situation, the microphone head 80 of the microphone body 1 sends the collected real-time audio signal to the main control assembly 20, which directly sends the real-time audio signal to the wireless assembly 40, the wireless assembly 40 sends the real-time audio signal to the wireless communicator 2 through wireless transmission, and the wireless communicator 2 sends the real-time audio signal to the terminal, the terminal does not process the real-time audio signal according to the user's instruction to turn off the processing function, allowing the terminal to broadcast in real-time based on the real-time audio signal.

In further another situation, for example, the microphone head 80 of the microphone body 1 sends the collected real-time audio signal to the main control assembly 20, which directly sends the real-time audio signal to the wireless assembly 40, the wireless assembly 40 sends the real-time audio signal to the wireless communicator 2 through wireless transmission, and the wireless communicator 2 sends the real-time audio signal to the terminal, the terminal processes the real-time audio signal according to the user's instruction to enable the processing function and obtains the processed audio signal, so that the terminal can broadcast in real time based on the processed audio signal.

In further another situation, for example, the terminal sends the processed audio signal to the wireless communicator 2, which sends the processed audio signal to the wireless assembly 40 through wireless transmission, the wireless assembly 40 sends the processed audio signal to the main control assembly 20, which then sends the processed audio signal to the earphones connected to the microphone body 1 for real-time listening by the user.

It should be noted that if the wire interface assembly 30 (the XLR interface 31 described below) is connected to the terminal through a data cable and the wireless assembly 40 is also connected to the terminal through a wireless communicator 2, the desktop microphone will prioritize the wire interface assembly 30 to communicate with the terminal through the data cable. When unplugging the data cable connected to the wire interface assembly 30, the desktop microphone will select the wireless assembly 40 to communicate with the terminal through the wireless communicator 2. In addition, when the desktop microphone communicates with the terminal through the wire interface assembly 30 via a data cable, the terminal can also serve as a power source to charge the battery 60 (as described below) in the microphone body 1.

Based on the microphone body 1 in the present embodiment, a wire interface assembly 30 is designed, which is connected to the terminal through a data cable for wire communication, to achieve audio signal transmission through wire transmission; or by designing wireless assembly 40, wireless assembly 40 is wirelessly connected to the terminal through a wireless communicator 2 to achieve audio signal transmission through wireless transmission; or by integrating the wire interface assembly 30 and the wireless assembly 40 into the housing 10 of the same desktop microphone body 1. Compared to the wire desktop microphone used only for wire transmission and the wireless desktop microphone used only for wireless transmission in related technologies, the pain point of the inability to balance the stability of wire desktop microphones and the flexibility of wireless desktop microphones is completely solved, achieving significant advantages of one machine covering the entire scene, one machine replacing two devices, and one machine simplifying the entire link, effectively improving the user experience.

It can be understood that the housing 10 serves as the shell component of the microphone body 1, in order to enhance the aesthetic appearance of the microphone body 1, the housing 10 can be made of or contains metal material (such as aluminum alloy, stainless steel, or brass, etc.). The high thermal conductivity of metal allows the housing 10 made of metal material to also serve as a heat sink, which is conducive to timely discharging the heat generated by the main control assembly 20 and the power supply (as described below) to the accommodating chamber 10*a* of the housing 10. Of course, the housing 10 can also be made of insulating non-metallic materials (such as plastic, rubber, ceramic, or glass), or a part of the structure of the housing 10 can be made of metallic materials and another part of the structure can be made of insulating non-metallic materials.

Figure 5:
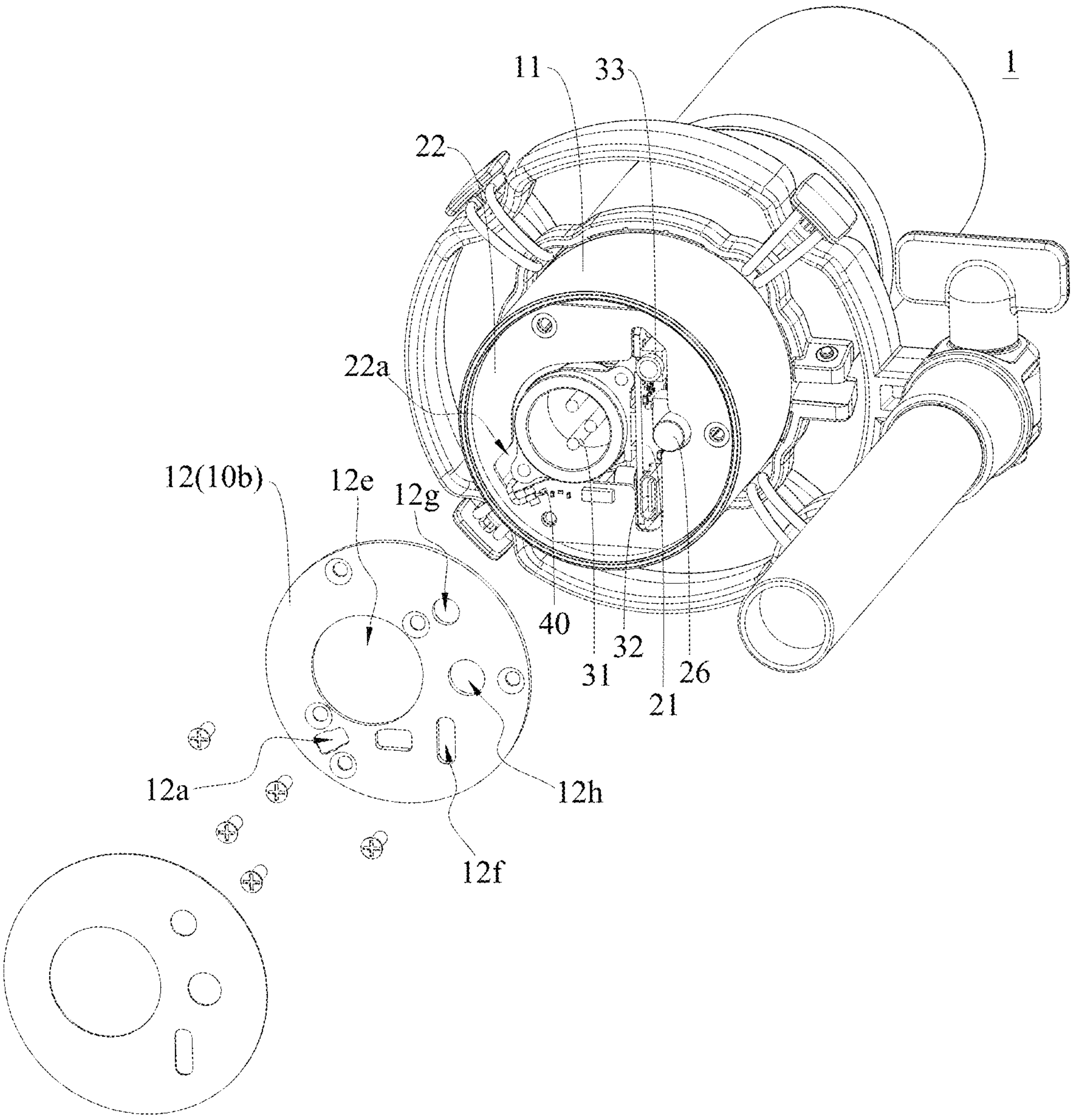
FIG. 5 is a second partially exploded diagram of a microphone body according to one embodiment of the present disclosure.
Figure 6:
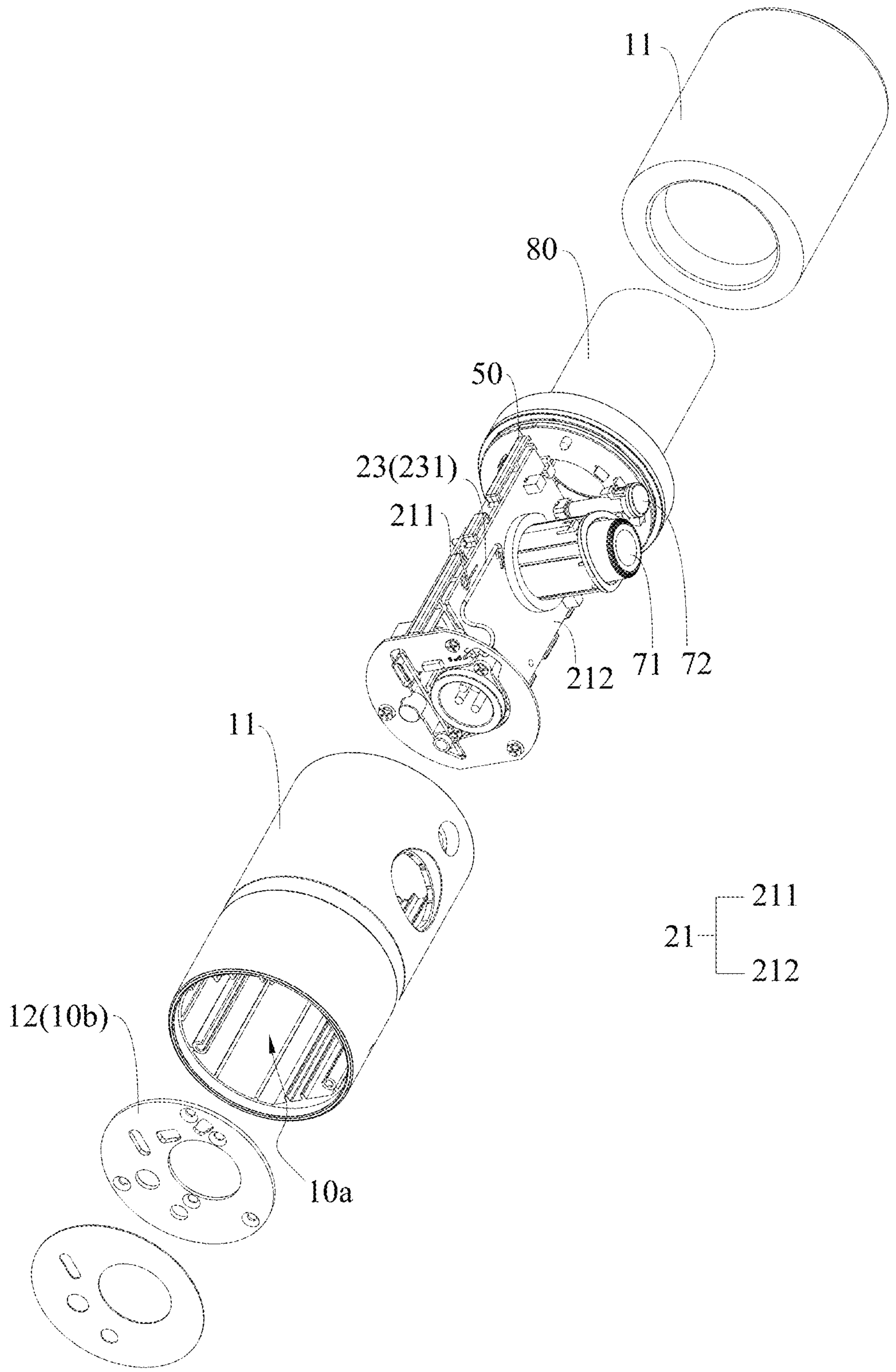
FIG. 6 is a third partially exploded diagram of a microphone body according to one embodiment of the present disclosure.
Figure 7:
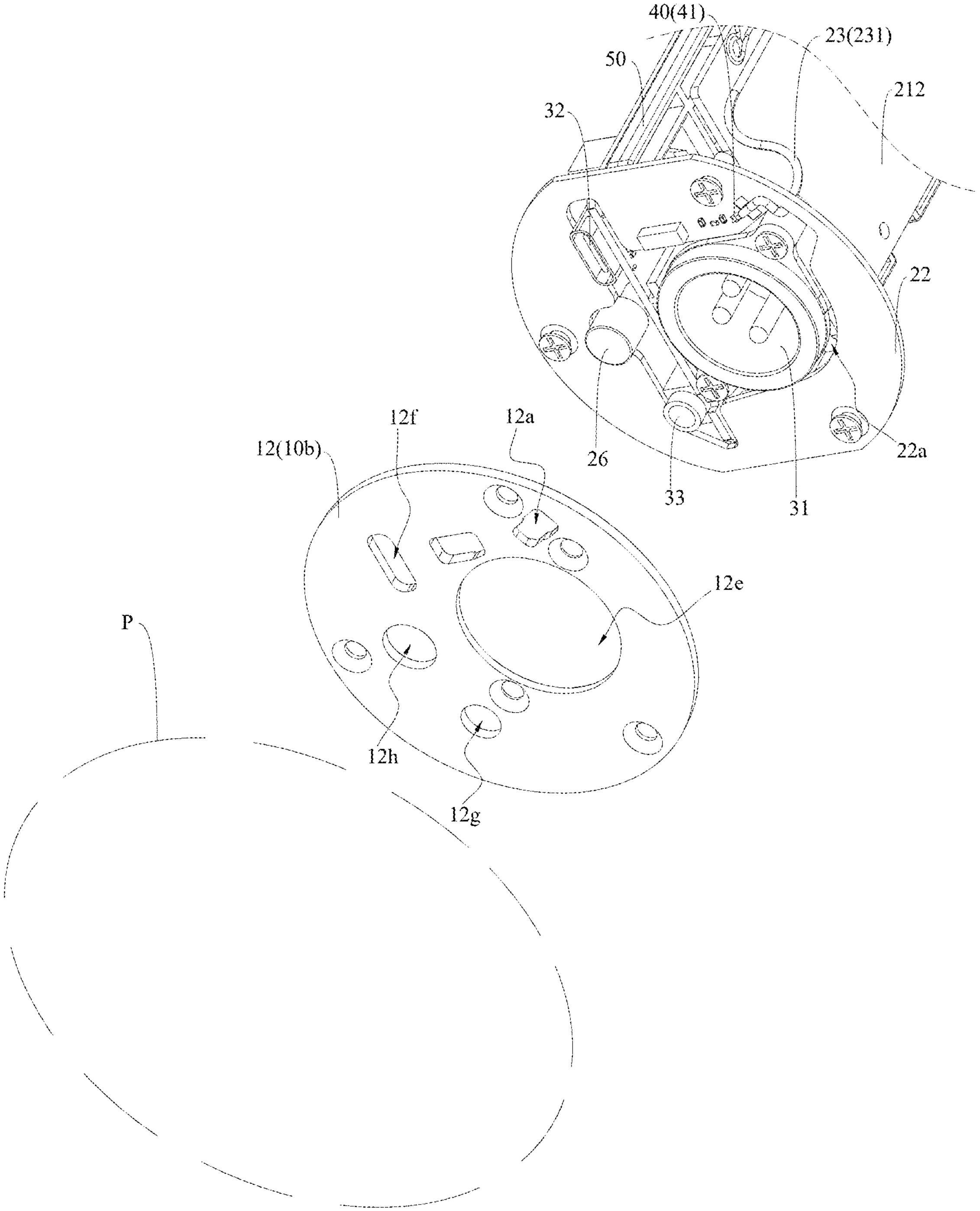
FIG. 7 is a fourth partially exploded diagram of a microphone body according to one embodiment of the present disclosure.

When the material of the casing 10 contains metal, considering that the wireless transmission of audio signals during wireless communication between the wireless assembly 40 and the wireless communicator 2 is easily affected by the dual interference of the "physical barrier+electromagnetic shielding" of the metal casing 10, it can affect the sound quality, transmission stability, and even cause signal interruption of the audio signal. To reduce the impact of the metal shell 10 on audio signals, as shown in FIGS. 5-7, the shell 10 is designed to include an avoidance portion 10*b* for audio signal penetration, an orthographic projection of the avoidance portion 10*b* on a surface at least partially overlaps with an orthographic projection of the wireless assembly 40 on the surface. The surface can be a designated reference surface P which overlaps or is tangent to a surrounded surface surrounded by the edge of the avoidance portion 10*b*; for example, when the surrounded surface surrounded by the edge of the avoidance portion 10*b* is a plane surface, the designated reference surface P coincides with the plane; in another situation, when the surrounded surface surrounded by the edge of the avoidance portion 10*b* is a curved surface, the designated reference surface P is tangent to the curved surface.

Wherein, the avoidance portion 10*b* can be in the form of openings or insulated non-metallic materials to achieve the passage of audio signals.

By designing the avoidance section 10*b* and ensuring that the orthographic projection of the avoidance section 10*b* on a surface (the reference surface P) at least partially overlaps with the orthographic projection of the wireless assembly 40 on the surface, the real-time audio signal and the processed audio signal obtained by the main control assembly 20 can smoothly pass through the avoidance section 10*b* in a wireless transmission manner from the end side where the wireless assembly 40 is located and be sent to the wireless communicator 2. The processed audio signal obtained by the terminal can also smoothly pass through the avoidance section 10*b* in a wireless transmission manner from the end side where the wireless communicator 2 is located and be sent to the wireless assembly 40, reducing or even avoiding interference, ensuring the sound quality of the audio signal, improving the stability of audio signal transmission, and avoiding signal interruption. It can be understood that the higher the overlap between the orthographic projection of the avoidance portion 10*b* on a surface (the reference surface P) and the orthographic projection of the wireless assembly 40 on the surface, the smaller the obstruction of other parts of the housing 10 (i.e., parts that do not belong to the avoidance portion 10*b*) on the wireless assembly 40, and the worse the shielding effect on the audio signal.

The housing 10 includes a shell 11 and a cover 12, the shell 11 has the above-mentioned accommodating chamber 10*a*, and the cover 12 is connected to the shell 11 to cover a chamber opening of the accommodating chamber 10*a*, and the main control assembly 20 is connected to the shell 11. In one situation, when the cover 12 is directly connected to the shell 11, the cover 12 can be, but is not limited to, detachably connected to the shell 11 through at least one of screwing, clamping, or plugging to cover the cavity 10*a* of the shell 11. The cover 12 can also be, but is not limited to, non detachably connected to the shell 11 through adhesive bonding or riveting to cover the cavity 10*a* of the shell 11. In another situation, when the cover 12 is indirectly connected to the shell 11 (such as the cover 12 being connected to the shell 11 through an intermediate connection structure), the cover 12 can be, but is not limited to, detachably connected to an intermediate connection structure (such as the bracket 50 described below) through at least one of screwing, clamping, or plugging to cover the chamber opening of the accommodating chamber 10*a* of the shell 11. The cover 12 can also be, but is not limited to, non detachably connected to an intermediate connection structure through adhesive bonding or riveting to cover the chamber opening of the accommodating chamber 10*a* of the shell 11.

Specifically, the specific design form of the avoidance portion 10*b* can include but is not limited to the following embodiments.

As shown in FIGS. 5-7, in the first embodiment, the material of the housing 11 contains metal, the cover 12 is made of insulating non-metallic material, and the cover 12 serves as the aforementioned avoidance portion 10*b*. The material of the cover 12 can be, but is not limited to, plastic, rubber, ceramic, or glass; plastic, rubber, and ceramic materials have no shielding effect on audio signals, while glass materials only have a weak shielding effect on audio signals. By designing the cover 12 as an insulating non-metallic material and using the entire cover 12 as the avoidance portion 10*b*, the cover 12 has no shielding effect on audio signals or only produces weak shielding effect, this allows real-time audio signals and processed audio signals obtained by the main control assembly 20 to smoothly pass through the cover 12 in a wireless transmission manner from the end side of the wireless assembly 40 and be sent to the wireless communicator 2, it also allows the processed audio signals obtained by terminal processing to smoothly pass through the cover 12 in a wireless transmission manner from the end side of the wireless communicator 2 and be sent to the wireless assembly 40, reducing or even avoiding interference, ensuring the sound quality of audio signals, improving the stability of audio signal transmission, and avoiding signal interruption.

Furthermore, an opening 12*a* is provided in the cover 12 corresponding to the area of the wireless assembly 40. Based on the insulating non-metallic material of the cover 12, the opening 12*a* is designed the cover 12 in the area corresponding to the wireless assembly 40, so that the cover 12 does not block the wireless assembly 40, this can further reduce or even avoid interference, ensure the sound quality of audio signals, further improve the stability of audio signal transmission, and avoid signal interruption.

Figure 8:
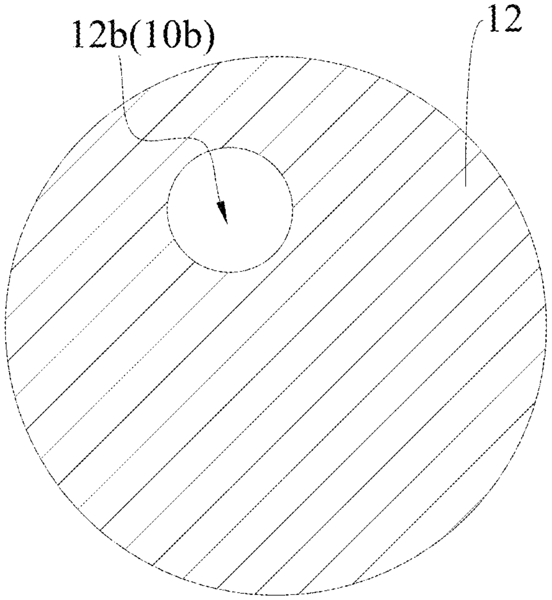
FIG. 8 is a cross sectional view of a cover having a first through hole used as an avoidance portion according to one embodiment of the present disclosure.

As shown in FIG. 8, in the second embodiment, a material of the housing 11 contains metal, and the material of the cover 12 is metal. The cover 12 is provided with a first through hole 12*b*, and the first through hole 12*b* serves as the aforementioned avoidance portion 10*b*. The material of the cover 12 can be, but is not limited to, aluminum alloy, stainless steel, brass, etc. By designing the cover 12 as a metal material and creating a first through hole 12*b* as the avoidance portion 10*b* on the cover 12, real-time audio signals and processed audio signals obtained by the main control assembly 20 can smoothly pass through the first through hole 12*b* in a wireless transmission manner from the end side where the wireless assembly 40 is located and be sent to the wireless communicator 2, this also enables the processed audio signals obtained by the terminal to smoothly pass through the first through hole 12*b* in a wireless transmission manner from the end side where the wireless communicator 2 is located and be sent to the wireless assembly 40, reducing or even avoiding interference, ensuring the sound quality of audio signals, improving the stability of audio signal transmission, and avoiding signal interruption.

Figure 9:
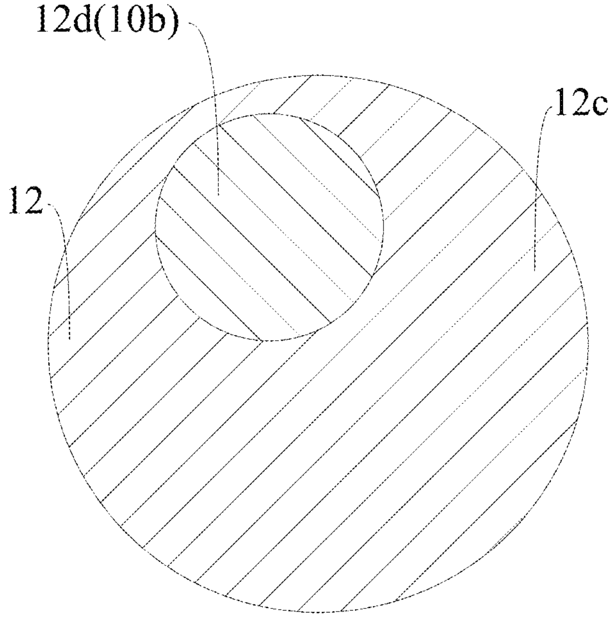
FIG. 9 is a cross sectional view of a cover having a second part used as an avoidance portion according to one embodiment of the present disclosure.
Figure 10:
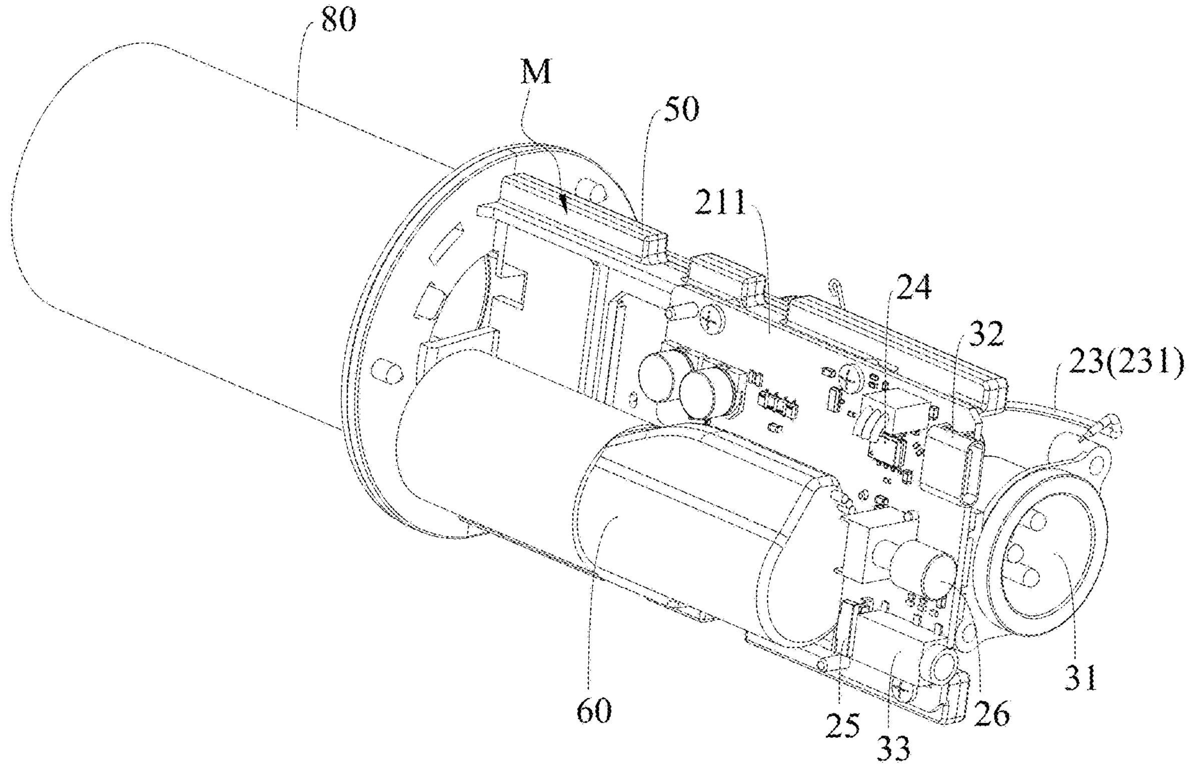
FIG. 10 shows a battery installed on the first side of the bracket according to one embodiment of the present disclosure.
Figure 11:
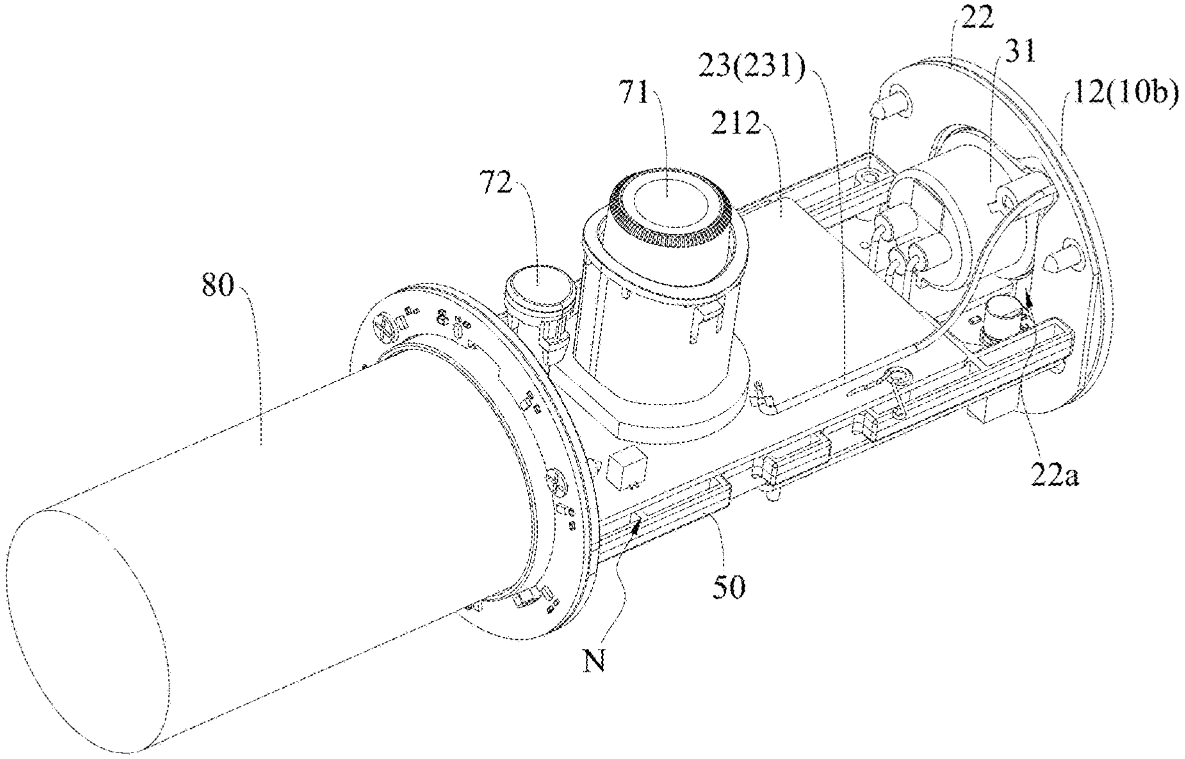
FIG. 11 shows an input assembly arranged on a second circuit board according to one embodiment of the present disclosure.
Figure 12:
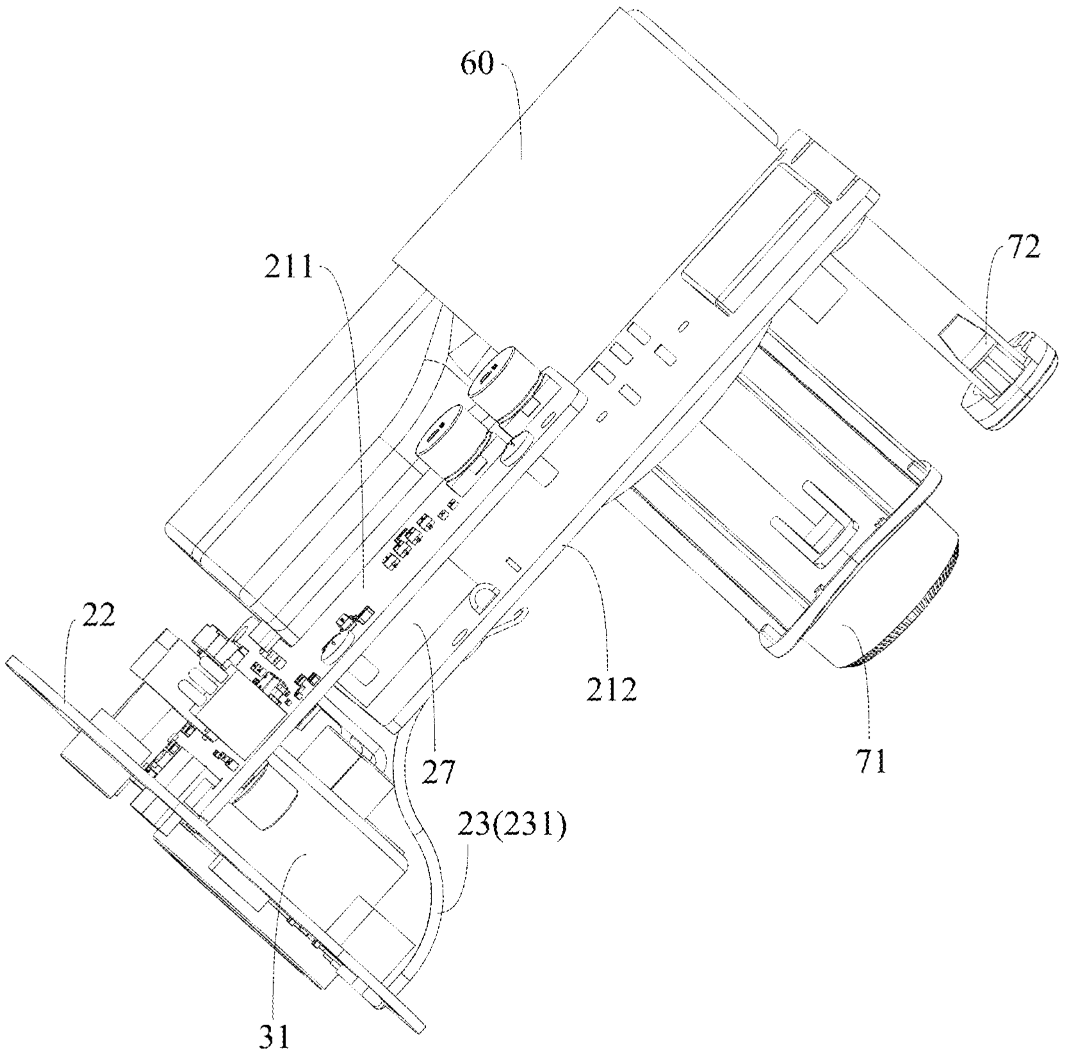
FIG. 12 is a schematic view showing the first circuit board and the second circuit board are electrically connected through an electrical connector according to one embodiment of the present disclosure.

As shown in FIG. 9, in the third embodiment, the material of the housing 11 contains metal, and the cover 12 includes a first part 12*c* and a second part 12*d* connected to the first part 12*c*, the material of the first part 12*c* is metal, the second part is an insulating non-metallic material, and the second part 12*d* serves as the aforementioned avoidance portion 10*b*. The material of the first part 12*c* can be, but is not limited to, aluminum alloy, stainless steel, brass, etc; and the material of the second part 12*d* can be, but is not limited to, plastic, rubber, ceramic, or glass. Plastic, rubber, and ceramic materials have no shielding effect on audio signals, while glass materials only have a weak shielding effect on audio signals. The relative positional relationship between the first part 12*c* and the second part 12*d* is not limited here, and designers can make reasonable designs according to actual needs, for example, the first part 12*c* can be set around the circumference of the second part 12*d*, and the first part 12*c* can also be set on one side of the second part 12*d*. The specific connection method between the first part 12*c* and the second part 12*d* is not limited here, and designers can make reasonable designs according to actual needs, for example, in one situation, the detachable fixed connection between the first part 12*c* and the second part 12*d* can be achieved through at least one of screw connection, card connection, or plug connection, but is not limited to them; in another situation, the non detachable fixed connection between the first part 12*c* and the second part 12*d* can also be achieved, but is not limited to, through bonding, riveting, injection molding, or 3D printing. By designing the cover 12 as a first part 12*c* and a second part 12*d* with different materials, designing the second part 12*d* as an insulating non-metallic material, and using the second part 12*d* as an avoidance portion 10*b*, the second part 12*d* has no shielding effect on audio signals or only produces weak shielding effect, this allows real-time audio signals and processed audio signals obtained by the main control assembly 20 to smoothly pass through the second part 12*d* wirelessly from the end side where the wireless assembly 40 is located and be sent to the wireless communicator 2, it also allows the processed audio signals obtained by the terminal to smoothly pass through the second part 12*d* wirelessly from the end side where the wireless communicator 2 is located and be sent to the wireless assembly 40, reducing or even avoiding interference, ensure the sound quality of audio signals, improve the stability of audio signal transmission, and avoid signal interruption.

In some other embodiments, when the cover 12 is made of metal material, the shell 11 can be made of insulating non-metallic material and serve as the above-mentioned avoidance portion 10*b*, or the shell 11 can include a third part (not shown in the figure) and a fourth part (not shown in the figure) connected to the third part, the third part is made of metal material, and the fourth part is made of insulating non-metallic material and serve as the above-mentioned avoidance portion 10*b*.

As shown in FIGS. 5-7, the cover 12 serves as the bottom cover and is connected to the bottom end of the housing 11, and the cover 12 has a second through hole 12*e* and a third through hole 12*f*. The wire interface assembly 30 includes a XLR interface 31 and a USB interface 32, the XLR interface 31 is electrically connected to the main control assembly 20, and the XLR interface 31 passes through the second through hole 12*e* of the cover 12; the USB interface 32 is electrically connected to the main control assembly 20, and the USB interface 32 passes through the third through hole 12*f* of the cover 12.

Among them, XLR interface 31 (commonly known as Cannon plug) adopts a three core cable (hot end, cold end, grounding), which can effectively suppress electromagnetic interference (EMI) and radio frequency interference (RFI), suitable for long-distance transmission of high fidelity audio signals. The USB interface is used to achieve the transmission and conversion of digital audio.

By designing the cover 12 as a bottom cover and connecting it to the bottom end of the housing 11, a second through hole 12*e* is designed on the cover 12 for the XLR interface 31 to pass through, and a third through hole 12*f* is designed for the USB interface 32 to pass through, so that the data cables connected to the XLR interface 31 and the USB interface 32 can be pulled out from the bottom end of the housing 11 for easy wiring.

As shown in FIGS. 6, 7, 10, and 11, the microphone body 1 also includes a bracket 50, which is installed on the housing 11 and at least partially located within the accommodating chamber 10*a* of the housing 11.

The circuit board 20*a* of the main control assembly 20 includes a main circuit board 21, an auxiliary circuit board 22. The main control assembly 20 further includes a conductive component 23, the main circuit board 21 is connected to the housing 11 via the bracket 50, the auxiliary circuit board 22 is located on one side of the cavity 10*a* of the cover 12 facing the housing 11, and the wireless assembly 40 is set on the auxiliary circuit board 22 and electrically connected to the auxiliary circuit board 22. One end of the conductive component 23 is electrically connected to the main circuit board 21, and the other end of the conductive component 23 is electrically connected to the wireless assembly 40.

In particular, the bracket 50 can be, but is not limited to, fixedly connected to the housing 11 in a detachable manner through at least one of screwing, clamping, or plugging, and the bracket 50 can also be, but is not limited to, fixedly connected to the housing 11 in a non detachable manner through adhesive bonding or riveting.

The main circuit board 21 can be a rigid circuit board, a flexible circuit board, or a combination of a rigid circuit board and a flexible circuit board. It should be noted that when the main circuit board 21 is a flexible circuit board, the microphone body 1 also includes a reinforcement board set on one side of the main circuit board 21, which provides support for the main circuit board 21. The specific connection method between the main circuit board 21 and the bracket 50 is not limited here, and designers can make reasonable designs according to actual needs, for example, in one situation, the main circuit board 21 can be, but is not limited to, fixedly connected to the bracket 50 in a detachable manner through at least one of screw connection, card connection, or plug connection; in another situation, the main circuit board 21 can also be fixedly connected to the bracket 50 in a non detachable manner, but not limited to, by adhesive bonding or riveting.

The auxiliary circuit board 22 can be a rigid circuit board, a flexible circuit board, or a combination of a rigid circuit board and a flexible circuit board. It should be noted that when the auxiliary circuit board 22 is a flexible circuit board, the microphone body 1 also includes another reinforcing plate set on one side of the auxiliary circuit board 22, which provides support for the auxiliary circuit board 22. The auxiliary circuit board 22 and the cover 12 can be detachably fixed to the housing 11 (or bracket 50) by locking screws. The auxiliary circuit board 22 and the cover 12 can also be detachably fixed to the housing 11 (or bracket 50) by locking pins. The auxiliary circuit board 22 and the cover 12 can also be detachably fixed to the housing 11 (or bracket 50) by inserting pins. The auxiliary circuit board 22 and the cover 12 can also be fixedly connected to the housing 11 (or bracket 50) by riveting with rivets. The auxiliary circuit board 22 and the cover 12 can also be fixedly connected to the housing 11 (or bracket 50) by adhesive bonding.

The conductive component 23 is used to achieve electrical conductivity between the main circuit board 21 and the wireless assembly 40, and the conductive component 23 can be, but is not limited to, wire 231, conductive spring, conductive spring, etc.

By designing the bracket 50, the bracket 50 provides installation support for main circuit board 21, reducing the installation difficulty of main circuit board 21. By designing the main circuit board 21 and the auxiliary circuit board 22, and placing the wireless assembly 40 on the auxiliary circuit board 22, using such separate boards can effectively avoid interference from other devices designed on the main circuit board 21 on the wireless assembly 40, further improving the stability of audio signal transmission. By designing the conductive component 23, which is used to achieve electrical conductivity between the main circuit board 21 and the wireless assembly 40, the real-time audio signal and the processed audio signal obtained by the main control assembly 20 can be sent from the end side of the main circuit board 21 to the wireless assembly 40 through the conductive component 23, the wireless assembly 40 then sends the real-time audio signal and the processed audio signal obtained by the main control assembly 20 to the wireless communicator 2 through wireless transmission, the processed audio signal obtained by the terminal can also be sent from the end side of the wireless communicator 2 to the wireless assembly 40 through wireless transmission, and the wireless assembly 40 then sends the processed audio signal obtained by the terminal to the main circuit board 21 through the conductive component 23.

Specifically, the specific manifestations of the wireless assembly 40, the position design of the wireless assembly 40 on the auxiliary circuit board 22, and the specific manifestations of the conductive component 23 can include but are not limited to one or more of the following embodiments.

In the first embodiment, the wireless assembly 40 includes an integrated antenna 41 arranged on the auxiliary circuit board 22, which serves as a transmitting and receiving antenna. The transmitting and receiving antenna is used to send audio signals (specifically the real-time audio signal and the processed audio signal obtained by the main control assembly 20) to the wireless communicator 2, and the transmitting and receiving antenna is also used to receive audio signals from the terminal (specifically the processed audio signal obtained by the terminal).

In the second embodiment, the wireless assembly 40 includes an integrated antenna 41 mounted on the auxiliary circuit board 22, which is a ceramic antenna. By designing the integrated antenna 41 as a ceramic antenna, the raw materials for ceramic antennas are abundant and the cost is cheap.

In the third embodiment, the wireless assembly 40 is positioned on the side of the auxiliary circuit board 22 facing the cover 12. This design can avoid the obstruction of the wireless assembly 40 by the auxiliary circuit board 22, thereby reducing the metal conductive lines in the auxiliary circuit board 22 causing interference to the wireless assembly 40 and further improving the stability of audio signal transmission.

In the fourth embodiment, the conductive component 23 includes a wire 231, one end of which is electrically connected to the main circuit board 21, and the other end of which is electrically connected to the wireless assembly 40. By designing the conductive component 23 as a wire 231, the wire 231 has flexibility and can be flexibly routed in space, which facilitates the electrical connection between the main circuit board 21 and the wireless assembly 40.

As shown in FIGS. 6, 7, 10, and 11, the auxiliary circuit board 22 has a hollow hole **22*a* for inserting the XLR interface 31 and the USB interface 32. An orthographic projection of the hole edge of the second through hole 12*e* on a surface (the reference surface P) is located within the orthographic projection of the hole edge of the hollow hole 22*a* on the surface, and the orthographic projection of the hole edge of the third through hole 12*f* on a surface (the reference surface P) is located within the orthographic projection of the hole edge of the hollow hole 22*a* on the surface. By designing a hollow hole 22*a* on the auxiliary circuit board 22, the hollow hole 22*a* can avoid the XLR interface 31 and not obstruct the XLR interface 31, ensuring that the XLR interface 31 can be inserted into the second through hole 12*e* of the cover 12. The hollow hole 22*a* can also avoid the USB interface 32 and not obstruct the USB interface 32, ensuring that the USB interface 32 can be inserted into the third through hole 12*f* of the cover 12. By designing the orthographic projection of the edge of the second through hole 12*e* on a surface (the reference surface P) to fall within the orthographic projection of the edge of the hollow hole 22*e* on the surface, thus the cross-sectional area of the hollow hole 22*e* is greater than that of the second through hole 12*e*, this can effectively reduce the problem of misalignment between the second through hole 12*e* and the hollow hole 22*e* caused by machining or assembly errors, resulting in the inability of the XLR interface 31 to pass through the hollow hole 22*e* and the second through hole 12*e* in sequence. By designing the orthographic projection of the edge of the third through hole 12*f* on a surface (the reference surface P) to fall within the orthographic projection of the edge of the hollow hole 22*a* on the surface, thus the cross-sectional area of the hollow hole 22*a* is greater than that of the third through hole 12*f*, this can effectively reduce the problem of misalignment between the third through hole 12*f* and the hollow hole 22*a* caused by processing or assembly errors, resulting in the USB interface 32 being unable to pass through the hollow hole 22*a* and the third through hole 12*f*** in sequence.

As shown in FIGS. 6, 7, 10, and 11, the main circuit board 21 includes a first circuit board 211 and a second circuit board 212; the first circuit board 211 is installed on the first side M of the bracket 50, and the second circuit board 212 is installed on the second side N of the bracket 50 which is opposite to the first side M, i.e., the first side M and the second side N are positioned opposite each other. The microphone body 1 also includes a battery 60 and an input assembly 70; the battery 60 is installed on the first side M of bracket 50, and is electrically connected to the first circuit board 211; the input assembly 70 is set on the second circuit board 212 and electrically connected to the second circuit board 212. The input assembly 70 is used to generate different control signals under user operation. The controller 24 of the main control assembly 20 implements different functions of the microphone body 1 according to different control signals.

In particular, the first circuit board 211 and the second circuit board 212 are at least partially staggered along an axial direction of the microphone body 1, that is, a projection of the first circuit board 211 on the bracket 50 only partially overlaps or completely does not overlap with a projection of the second circuit board 212 on the bracket 50.

Among them, the functions include at least one of mute on and off function, volume adjustment function, noise reduction processing function, and pitch change processing function. The input assembly 70 can include, but is not limited to, knobs 71, buttons 72, or a touch screen set on the housing 11. In a situation, the user can generate a first control signal (one of the above mentioned control signals, that is, the control signals includes the first control signal) by actually turning knob 71, and the controller 24 of the main control assembly 20 controls the microphone body 1 to achieve volume adjustment function based on the first control signal. In another situation, the user can generate a second control signal by pressing button 72 according to actual needs (another one of above mentioned control signals, that is, the control signals includes a second control signal different from the first control signal), and the controller 24 of the main control assembly 20 controls the microphone body 1 to achieve the function of mute on and off based on the second control signal. In further another situation, users can generate a third control signal (another one of above mentioned control signals, that is the control signals includes a third control signal different from the first and second control signals) by manipulating the touch screen according to actual needs. The controller 24 of the main control assembly 20 then controls the microphone body 1 to achieve noise reduction and sound transformation processing functions based on the third control signal.

The first circuit board 211 and the second circuit board 212 are respectively designed on the first side M and the second side N of the bracket 50, and the power supply is electrically connected to the first circuit board 211, and the input assembly 70 is electrically connected to the second circuit board 212. In this way, by designing the first circuit board 211 and the second circuit board 212 separately, the power supply and the input assembly 70 are arranged reasonably on the corresponding circuit boards, which can effectively avoid the power supply and the input assembly 70 being concentrated on the same circuit board and reduce the mutual interference between the power supply and the input assembly 70. In addition, the power supply and input assembly 70 are arranged on the first side M and the second side N of the bracket 50, respectively. By designing the layout position of the power supply and input assembly 70 in the spatial structure reasonably, the overall weight distribution of the microphone body 1 is more uniform, so that the microphone body 1 placed on the desktop is less likely to tilt.

As shown in FIGS. 6, 7, 10, and 12, the main control assembly 20 also includes an electrical connector 27, the electrical connector 27 is electrically connected to the first circuit board 211 and the second circuit board 212. The controller 24 is set on the first circuit board 211 and is electrically connected to the first circuit board 211. At least one of the XLR interface 31 and the USB interface 32 is electrically connected to the first circuit board 211, and at least the other of the XLR interface 31 and the USB interface 32 is electrically connected to the second circuit board 212. Among them, the XLR interface 31 can be electrically connected to the first circuit board 211, and the corresponding USB interface 32 can be electrically connected to the second circuit board 212. Alternatively, the USB interface 32 can be electrically connected to the first circuit board 211, and the corresponding XLR interface 31 can be electrically connected to the second circuit board 212. It is also possible that both the XLR interface 31 and the USB interface 32 are electrically connected to the first circuit board 211, while the second circuit board 212 has no interface connection. It is also possible that both the XLR interface 31 and the USB interface 32 are electrically connected to the second circuit board 212, while the first circuit board 211 has no interface connection.

By designing an electrical connector 27, the electrical connector 27 is used to achieve electrical connection between the first circuit board 211 and the second circuit board 212, so that different control signals generated by the input assembly 70 under user operation can be sent to the controller 24 set on the first circuit board 211 through the electrical connector 27, enabling the controller 24 to achieve different functions of the microphone body 1 according to different control signals.

Figure 13:
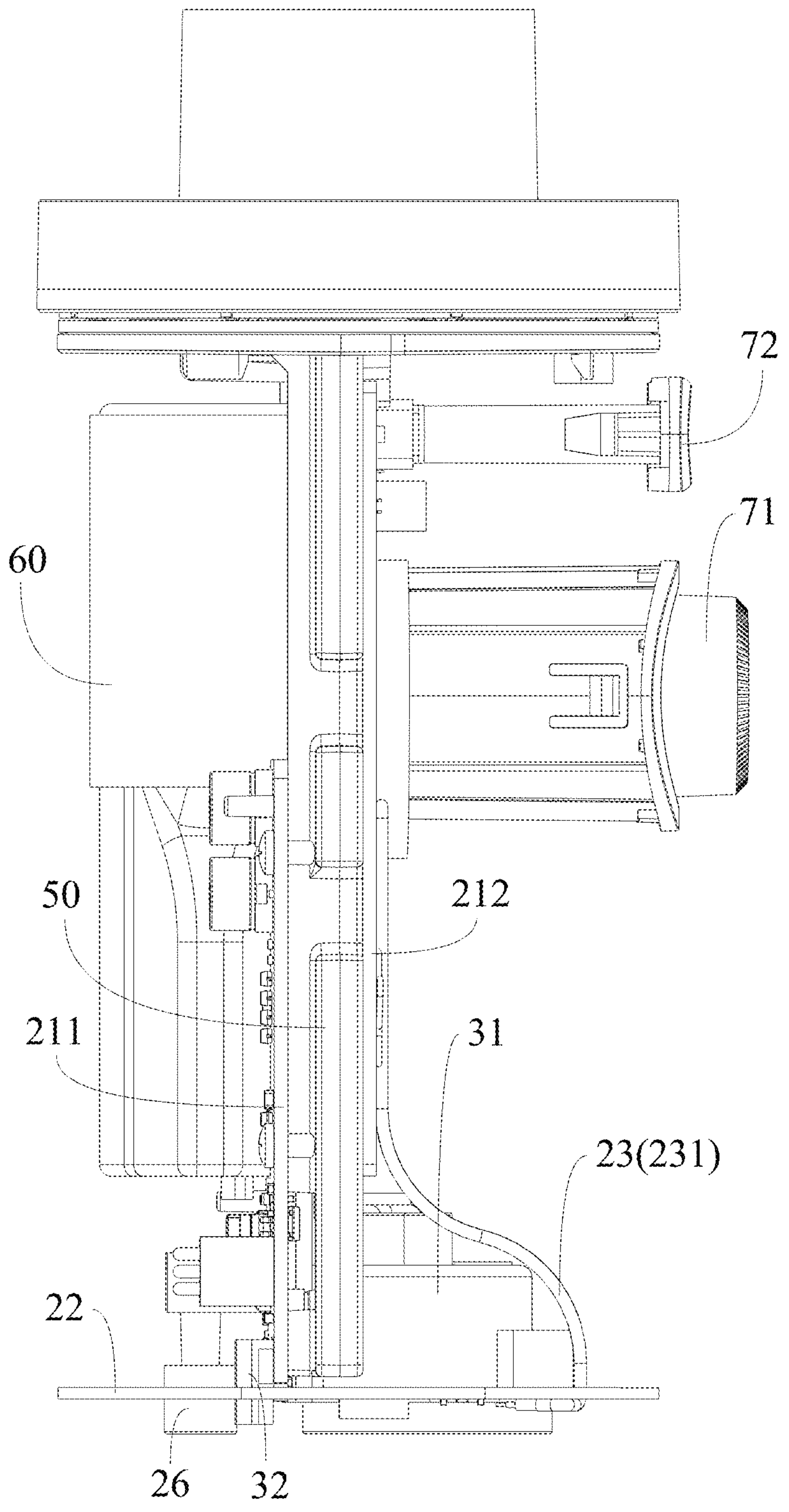
FIG. 13 is a schematic view showing the first circuit board and the second circuit board are arranged on the bracket according to one embodiment of the present disclosure.

As shown in FIG. 13, in the present embodiment of the application, the second circuit board 212 is farther away from the auxiliary circuit board 22 compared to the first circuit board 211; the XLR interface 31 is located on the side of the first circuit board 211 facing the second circuit board 212, and the XLR interface 31 is located below the second circuit board 212; the XLR interface 31 is electrically connected to the first circuit board 211; the USB interface 32 is located on the side of the first circuit board 211 away from the second circuit board 212, and is electrically connected to the first circuit board 211. This design makes the spatial arrangement of the XLR interface 31, USB interface 32, first circuit board 211, and second circuit board 212 more compact, which is conducive to reducing the overall volume of the microphone body 1, and this design facilitates the electrical connection between the XLR interface 31 and the USB interface 32 and the controller 24 installed on the first circuit board 211.

As shown in FIGS. 6, 7, 10, and 11, the cover 12 also has a fourth through hole 12*g*; the wire interface assembly 30 also includes an earphone jack 33 provided in the fourth through hole 12*g*, the earphone jack 33 is arranged on and electrically connected to the main circuit board 21. In particular, the earphone jack 33 can be, but is not limited to, a 3.5 mm interface, which is set on the first circuit board 211 and electrically connected to it. The orthographic projection of the hole edge of the fourth through hole 12*g* on a surface (the reference surface P) is located within the orthographic projection of the hole edge of the hollow hole 22*a* on the surface. By designing a hollow hole 22*a* on the auxiliary circuit board 22, the hollow hole 22*a* can avoid the earphone jack 33 and not obstruct the earphone jack 33, ensuring that the earphone jack 33 can be inserted into the fourth through hole 12*g* of the cover 12. By designing the orthographic projection of the edge of the fourth through hole 12*g* on a surface (the reference surface P) to fall within the orthographic projection of the edge of the hollow hole 22*a* on the surface, thus the cross-sectional area of the hollow hole 22*a* is greater than that of the fourth through hole 12*g*, this can effectively reduce the problem of misalignment between the fourth through hole 12*g* and the hollow hole 22*a* due to processing or assembly errors, which may cause the earphone jack 33 to be unable to pass through the hollow hole 22*a* and the fourth through hole 12*g* in sequence. By designing the earphone jack 33, users can plug the earphone data cable into the earphone jack 33 according to their actual needs, in order to listen audio signals in real time through the earphones.

As shown in FIG. 6, FIG. 7, FIG. 10, and FIG. 11, the main control assembly 20 also includes a reset switch 25 arranged directly opposite to the earphone jack 33. The reset switch 25 is set on the main circuit board 21 and is electrically connected to the main circuit board 21. External components can pass through the earphone jack 33 and press the reset switch 25 to trigger the reset switch 25. In particular, the reset switch 25 is set on the first circuit board 211 and electrically connected to the first circuit board 211. When the reset switch 25 is triggered, some parameters adjusted by the user through operating the input assembly 70 will be reset. The external components can be, but are not limited to, toothpicks, cotton swabs, needle bodies, and other parts that can be used to insert into earphone jack 33. By designing the reset switch 25 to face the earphone jack 33, there is no need to create additional through holes on the cover 12 for external components to pass through, allowing the earphone jack 33 to have two functions (i.e., plug the earphone data cable or external components to press the reset switch 25 to trigger the reset switch 25) simultaneously and reducing processing costs.

As shown in FIGS. 6, 7, 10, and 11, the cover 12 also has a fifth through hole 12*h*, the main control assembly 20 also includes a power switch 26, which is inserted through the fifth through hole 12*h*. The power switch 26 is located on the main circuit board 21 and is electrically connected to the main circuit board 21. In particular, the power switch 26 is set on the first circuit board 211 and electrically connected to the first circuit board 211, and the power switch 26 realizes the power on and off function of the microphone body 1 under the user's pressing operation. The orthographic projection of the edge of the fifth through hole 12*h* on a surface (the reference surface P) is located within the orthographic projection of the edge of the hollow hole 22*a* on the surface. By designing a hollow hole 22*a* on the auxiliary circuit board 22, the hollow hole 22*a* can avoid the power switch 26 and not obstruct the power switch 26, ensuring that the power switch 26 can be inserted into the fifth through hole 12*h* of the cover 12. By designing the orthographic projection of the edge of the fifth through hole 12*h* on a surface (the reference surface P) to fall within the orthographic projection of the edge of the hollow hole 22*h* on the surface, the cross-sectional area of the hollow hole 22*h* is greater than that of the fifth through hole 12*h*, this can effectively reduce the problem of misalignment between the fifth through hole 12*h* and the hollow hole 22*h* caused by machining or assembly errors, which can result in the power switch 26 being unable to pass through the hollow hole 22*a* and the fifth through hole 12*h* in sequence.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A microphone body for desktop microphone, the microphone body comprising:

a housing comprising an accommodating chamber;

a main control assembly, wherein at least part of the main control assembly is received in the accommodating chamber and connected to the housing, and the main control assembly configured for controlling transmission and reception of audio signals;

a wire interface assembly, wherein at least part of the wire interface assembly is received in the accommodating chamber and electrically connected to the main control assembly; and a wireless assembly, wherein at least part of the wireless assembly is received in the accommodating chamber and electrically connected to the main control assembly, and the wireless assembly is configured to communicate wirelessly with an external device;

wherein a material of the housing contains metal, and the housing comprises an avoidance portion for audio signal penetration, an orthographic projection of the avoidance portion on a surface perpendicular to a predetermined direction at least partially overlaps with an orthographic projection of the wireless assembly on the surface.

2. The microphone body according to claim 1, wherein the surface coincides with or is tangent to a surrounded surface surrounded by an edge of the avoidance portion.

3. The microphone body according to claim 1, wherein the housing comprises a shell and a cover, the accommodating chamber is formed in the shell with a chamber opening, the cover is connected to the shell to cover the chamber opening, the main control assembly is connected to the shell;

a material of the shell contains metal, the cover is made of insulating non-metallic material, and the cover is used as the avoidance portion.

4. The microphone body according to claim 3, wherein an area of the cover corresponding to the wireless assembly is provided with an opening.

5. The microphone body according to claim 1, wherein the housing comprises a shell and a cover, the accommodating chamber is formed in the shell with a chamber opening, the cover is connected to the shell to cover the chamber opening, the main control assembly is connected to the shell;

a material of the shell contains metal, the cover is made of metallic material, and the cover comprises a first through hole, and the first through hole serves as the avoidance portion.

6. The microphone body according to claim 1, wherein the housing comprises a shell and a cover, the accommodating chamber is formed in the shell with a chamber opening, the cover is connected to the shell to cover the chamber opening, the main control assembly is connected to the shell;

a material of the shell contains metal, the cover comprises a first part and a second part connected to the first part, the first part is made of metallic material, the second part is made of insulating non-metallic material, and the second part serves as the avoidance portion.

7. The microphone body according to claim 3, wherein the cover is used as a bottom cover covering a bottom end of the shell, and the cover comprises a second through hole and a third through hole;

the wire interface assembly comprises a XLR interface electrically connected to the main control assembly, and a USB interface, the XLR interface exposed at second through hole, and the USB interface exposed at the third through hole.

8. The microphone body according to claim 7, wherein the microphone body further comprises a bracket, the bracket is installed in the housing and at least part of the bracket is located within the accommodating chamber;

the main control assembly comprises a main circuit board, an auxiliary circuit board, and a conductive component, the main circuit board is connected to the housing via the bracket, and the auxiliary circuit board is located on one side of the cover facing the chamber opening of the accommodating chamber, the wireless assembly is arranged on the auxiliary circuit board and electrically connected to the auxiliary circuit board, one end of the conductive component is electrically connected to the main circuit board, and the other end of the conductive component is electrically connected to the wireless assembly.

9. The microphone body according to claim 8, wherein the wireless assembly comprises an integrated antenna arranged on the auxiliary circuit board, and configured for a transmitting and receiving antenna, and the transmitting and receiving antenna is used to send audio signals to the wireless communicator, and the transmitting and receiving antenna is also used to receive audio signals from the terminal.

10. The microphone body according to claim 8, wherein the wireless assembly comprises an integrated antenna arranged on the auxiliary circuit board, and the integrated antenna is a ceramic antenna.

11. The microphone body according to claim 8, wherein the wireless assembly is arranged on a side of the auxiliary circuit board facing the cover.

12. The microphone body according to claim 8, wherein the conductive component comprises a wire, one end of the wire is electrically connected to the main circuit board, and the other end of the wire is electrically connected to the wireless assembly.

13. The microphone body according to claim 8, wherein the auxiliary circuit board has hollow holes for the XLR interface and the USB interface to pass through, an orthographic projection of an edge of the second through hole on the surface falls within an orthographic projection of an edge of the hollow hole on the surface; and an orthographic projection of an edge of the third through hole on the surface falls within an orthographic projection of the edge of the hollow hole on the surface.

14. The microphone body according to claim 8, wherein the main circuit board comprises a first circuit board and a second circuit board, the first circuit board is mounted on a first side of the bracket, and the second circuit board is mounted on a second side of the bracket, the first side is opposite to the second side;

the microphone body further comprises a battery and an input assembly, the battery is installed on the first side of the bracket and is electrically connected to the first circuit board, the input assembly is arranged on the second circuit board and is electrically connected to the second circuit board, and the input assembly is used to generate different control signals under user operation; a controller of the main control assembly implements different functions of the microphone body according to different control signals, and the functions include at least one of mute on and off function, volume adjustment function, noise reduction processing function, and voice changing processing function.

15. The microphone body according to claim 14, wherein the main control assembly further comprises an electrical connector electrically connected to the first circuit board and the second circuit board, the controller is arranged on the first circuit board and is electrically connected to the first circuit board;

at least one of the XLR interface and the USB interface is electrically connected to the first circuit board, and at least the other of the XLR interface and the USB interface is electrically connected to the second circuit board.

16. The microphone body according to claim 8, wherein the cover also has a fourth through hole, the wire interface assembly further comprises an earphone jack, wherein the earphone jack is provided with the fourth through hole, and the earphone jack is arranged on the main circuit board and electrically connected to the main circuit board;

the main control assembly further comprises a reset switch arranged opposite to the earphone jack, wherein the reset switch is arranged on the main circuit board and electrically connected to the main circuit board, and the earphone jack is configured for an external component stretching into and pressing the reset switch to trigger the reset switch.

17. A desktop microphone, comprising:

a wireless communicator capable of communicating with external terminals; and the microphone body of claim 1, wherein the wireless communicator serves as the external device, and the wireless assembly communicates wirelessly with the wireless communicator.

18. A desktop microphone, comprising:

a microphone body;

wherein the microphone body comprises:

a housing comprising an accommodating chamber;

a main control assembly, configured for controlling transmission and reception of audio signals, wherein at least part of the main control assembly is received in the accommodating chamber, and the main control assembly includes a circuit board connected to the housing;

a wire interface assembly, wherein at least part of the wire interface assembly is received in the accommodating chamber, and the wire interface assembly is arranged on the circuit board and is electrically connected to the circuit board; and a wireless assembly, wherein at least part of the wireless assembly is received in the accommodating chamber, the wireless assembly is arranged on the circuit board and is electrically connected to the circuit board, and the wireless assembly is configured to communicate wirelessly with an external device;

wherein the microphone body further comprises a bracket, the bracket is mounted in the housing, and at least part of the bracket is received in the accommodating chamber;

the circuit board comprises a main circuit board comprising a first circuit board and a second circuit board, the first circuit board is mounted on a first side of the bracket, and the second circuit board is mounted on a second side of the bracket opposite to the first side;

the wire interface assembly comprises a XLR interface and a USB interface, wherein at least one of the XLR interface and the USB interface is electrically connected to the first circuit board, and at least the other of the XLR interface and the USB interface is electrically connected to the second circuit board.

19. The desktop microphone according to claim 18, wherein the first circuit board and the second circuit board are at least partially staggered along an axial direction of the microphone body.

20. The desktop microphone according to claim 18, wherein the microphone body further comprises a battery and an input assembly, the battery is arranged on the first side of the bracket and is electrically connected to the first circuit board, the input assembly is arranged on the second circuit board and is electrically connected to the second circuit board, the input assembly is used to generate different control signals under user operation, and a controller of the main control assembly implements different functions of the microphone body according to different control signals; with the functions including at least one of mute on and off function, volume adjustment function, noise reduction processing function, and voice changing processing function.

21. The desktop microphone according to claim 20, wherein the main control assembly further comprises an electrical connector, the electrical connector electrically connects the first circuit board and the second circuit board, and the controller is arranged on the first circuit board and electrically connected to the first circuit board.

22. The desktop microphone according to claim 18, wherein the housing comprises a shell and a cover, wherein the accommodating chamber is formed in the shell, the cover is connected to the shell to cover an opening of the accommodating chamber, and the bracket is mounted in the shell;

the circuit board further comprises an auxiliary circuit board, and the main control assembly further comprises a conductive component, the auxiliary circuit board is located on one side of the cover facing the opening of the accommodating chamber, and the wireless assembly is arranged on the auxiliary circuit board and electrically connected to the auxiliary circuit board, one end of the conductive component is electrically connected to the second circuit board, and the other end of the conductive component is electrically connected to the wireless assembly.

23. The desktop microphone according to claim 22, wherein the second circuit board is farther away from the auxiliary circuit board relative to the first circuit board, the XLR interface is located on a side of the first circuit board facing the second circuit board, and is located below the second circuit board, the XLR interface is electrically connected to the first circuit board, and the USB interface is located on a side of the first circuit board away from the second circuit board, and is electrically connected to the first circuit board.

24. The desktop microphone according to claim 18, wherein the wire interface assembly further comprises an earphone jack arranged on the first circuit board and electrically connected to the first circuit board.

25. The desktop microphone according to claim 24, wherein the main control assembly further comprises a reset switch arranged opposite to the earphone jack, the reset switch is arranged on the first circuit board and electrically connected to the first circuit board, and the earphone jack is used for an external component to enter and press the reset switch to trigger the reset switch.

* * * * *